L. B. DOMER.
TRACTOR.
APPLICATION FILED AUG. 28, 1917.
1,287,261.
Patented Dec. 10, 1918.
3 SHEETS—SHEET 3.
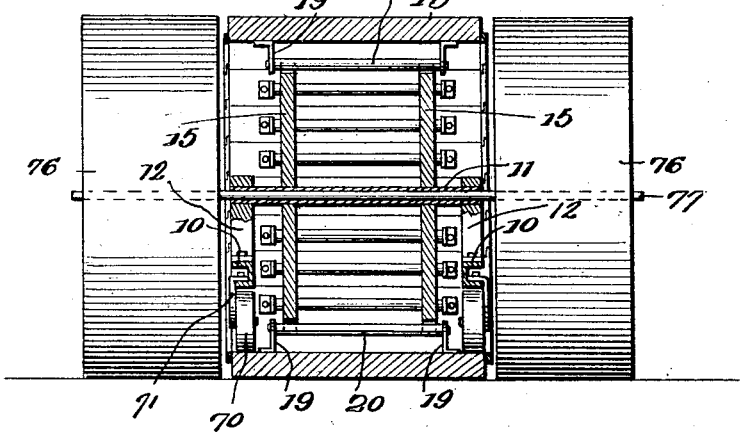
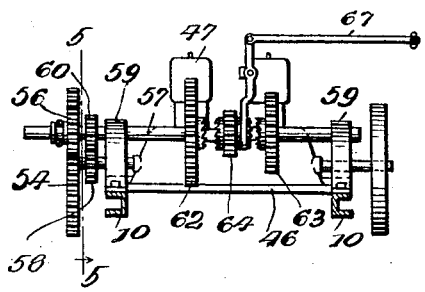
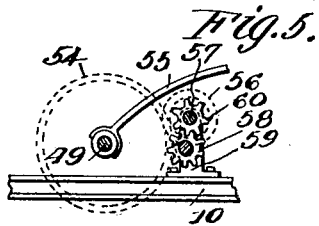
WITNESSES
Guy M. Spring
Wm Zeaman
INVENTOR
Lester B. Dorner
BY Richard B. Owen
ATTORNEY

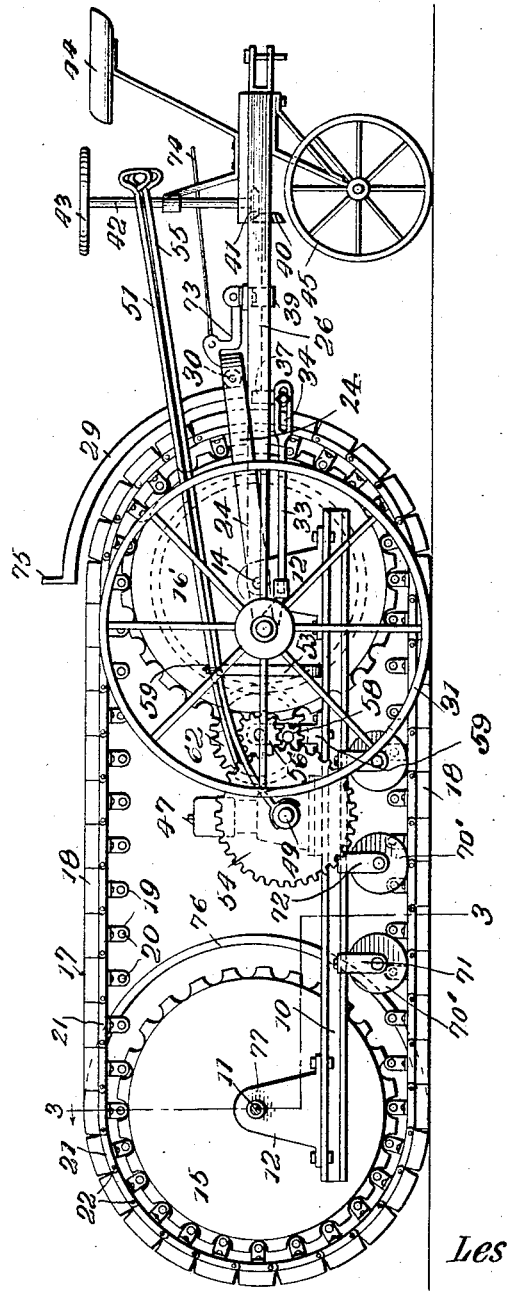

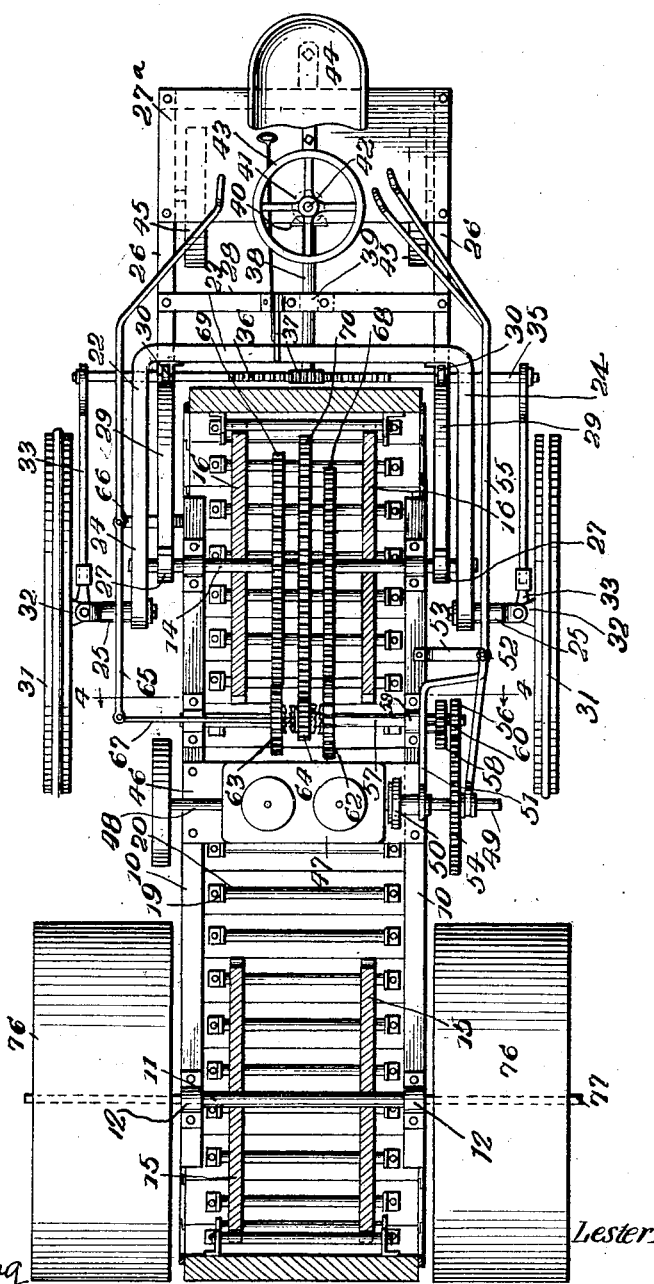

UNITED STATES PATENT OFFICE.

LESTER B. DOMER, OF NAVARRE, OHIO.

TRACTOR.

1,287,261.   Specification of Letters Patent.   Patented Dec. 10, 1918.

Application filed August 28, 1917. Serial No. 188,678.

*To all whom it may concern:*

Be it known that I, LESTER B. DOMER, a citizen of the United States, residing at Navarre, in the county of Stark and State of Ohio, have invented certain new and useful Improvements in Tractors, of which the following is a specification.

This invention has relation to tractors, and has for an object to improve the tractor of the caterpillar type in a manner to facilitate steering.

Another object of the invention is to provide an attachment for a tractor at times when the machine is driven over soft ground, whereby to provide an increased bearing surface of the machine.

A still further object of the invention is to provide a new and novel transmission means for transmitting power at variable rates of speed from the prime mover to the operating mechanism of the tractor.

A still further object of the invention is to provide an improved caterpillar tractor of the endless type with means on the inner surface thereof to permit engagement thereof with the operating wheel of the driving mechanism whereby the power may be more uniformly applied to the element of the tread thereby preventing unequality of stress upon any of the driving parts and insuring movement of the tractor in a straight line.

In addition to the foregoing, my invention comprehends improvements in the details of construction, and arrangement of the parts to be hereinafter more fully described and particularly set forth in the appended claims.

In the accompanying drawings in which similar and corresponding parts are designated by the same characters of reference throughout the several views in which they appear:

Figure 1, is a view in side elevation of a tractor embodying my improvement,

Fig. 2, is a view thereof in horizontal section,

Fig. 3, is a vertical section taken on the line 3—3 of Fig. 1,

Fig. 4, is a detail section taken transversely through the machine on the plane indicated by the line 4—4 of Fig. 2, and Fig. 5 is a detail section taken on the line 5—5 of Fig. 4.

With reference to the drawings, 10 indicates a pair of longitudinally extending channel beams, forming the main frame of the machine supporting upon their forward ends a transversely extending axle 11 which is journaled in pedestals 12, and at their rear ends an axle 14 is likewise journaled in pedestals, the forward axle however being preferably of a tubular construction. A pair of sprocket wheels 15 are mounted in spaced relation upon the forward axle 11 and rigidly secured thereto, a pair of sprocket wheels 16 being also similarly mounted upon the rear axle.

The tread 17, in accordance with the conventional construction is an endless band formed of a number of elements 18, in the nature of blocks which extend transversely of the machine corresponding in length to the width of the main frame. Each block is provided upon its inner surface adjacent its ends with an upstanding bracket 19 which supports therebetween a rod 20 circular in cross section. The rod 20, when the blocks are assembled in end to end relation should be spaced so as to be received between the teeth of the sprocket wheels 15 and 16. Each block is connected to its neighbor by means of links 21 which are secured to the block, the terminals of the links being pivotally connected together as at 22.

The rear axle 14 is extended beyond the bearings to support the terminals of a yoke 22 comprising a transversely extending or bight portion 23 and terminals 24, which terminals are apertured at a point adjacent their extremities to receive the projecting ends of the rear axle the extremities of the terminals however, extending beyond the rear axle and are provided with oppositely extending tubular stud shafts 25. The rear axle also serves as a means whereby a trailer may be connected to the tractor, said trailer comprising a pair of longitudinally extending frame bars 26 provided with apertured enlargements 27 at their forward ends through which the ends of the rear axle project. The opposite ends of the longitudinal frame member 26 are connected by means of a platform 27ª and at a point spaced inwardly from the platform with a cross bar 28.

A pair of arcuate guide members 29 are provided, each being supported upon one of its ends upon one of the longitudinal frame members 26 of the chassis and extending upward, the curvature thereof being concentric to the center of the rear axle. A pair of rollers are mounted upon the transversely extending member 23 of the yoke member 22, said rollers being indicated at 30 for engagement with the surfaces of the arcuate members 29.

A pair of ground engaging wheels 31 are provided, one at each side of the machine, said wheels being mounted for rotation upon steering knuckles 32 of the type used in automobiles. The steering knuckles are mounted in the tubular stud shafts 25 for rotation therein, and each knuckle is provided with a rearwardly extending arm 33 which extends to a point beyond the rear end of the chassis frame and provided with enlargements having longitudinally extending slots 34 formed therein. A transversely extending rod 35 is journaled for endwise movement in bearings depending from the longitudinal frame members 26 of the trailer, and the intermediate portion of said rod is provided with a series of rack teeth 36, for meshing engagement with a pinion 37 fixedly mounted on the rear end of a rod 38 which extends longitudinally and centrally of the trailer and is journaled in a bracket 39 depending from the cross bar 28. The extreme rearward end of the rod 38 is provided with a bevel gear 40 which meshes with a bevel gear 41 fixedly secured to the lower end of an upstanding steering column 42 journaled in the platform 27ª of the trailer with a steering wheel 43 fixedly secured to the upper end of said column. A seat 44 is conveniently mounted upon the platform for occupation by the operator of the machine. The rear end of the trailer is mounted upon a pair of ground engaging wheels 45 which are swiveled to the platform.

A transversely extending platform 46 is mounted at its ends upon the longitudinal channel beams 10 of the main frame to support an internal combustion engine 47 or other source of power. The crank shaft 48 of the engine is adapted to be connected to a jack shaft 49 by means of a cone clutch 50 which is actuated by means of a lever 51 fulcrumed at 52 upon a bracket 53 extending from one of the members of the main frame, with the rear end of the lever disposed in close proximity to the seat 44. The jack shaft 49 supports a gear 54 which is splined thereto for longitudinal motion, being shiftable by means of a lever 55 fulcrumed upon the bracket 53 and having its rear end disposed in a position to be grasped by the operator seated on the trailer. The gear 54 is adapted to be thrown into engagement either with a gear 56 mounted upon a transversely extending counter shaft 57, or with an idler gear 58 mounted on a bearing 59 which supports one end of the shaft 57, said idler meshing at all times with a pinion 60 likewise mounted on the shaft 57.

The transversely extending shaft 57 carries a pair of gears 62 and 63 upon its intermediate portion, said gears having toothed clutch faces formed on their adjacent faces, and a gear 64 between said gears, said gear 64 having a clutch face on each side for alternate engagement with the clutch faces of the gears 62 and 63. The gear 64 is splined to the shaft, is shiftable by means of a lever 65 disposed at the side of the machine opposite that carrying the above mentioned levers 51 and 55, and is fulcrumed upon a bracket 66 extending from the main frame of the machine with its rear end in proximity to the seat of the trailer. The forward end of the lever is connected by means of a link 67 to the gear 64, the gears 62 and 63 being loosely mounted on the shaft 57. Three gears, indicated at 68, 69 and 70 are fixedly mounted upon the rear axle 14 and are of different diameters for meshing engagement with the gears 62, 63 and 64 respectively which are likewise of different diameters.

The main frame of the machine is supported upon rollers, 70′ which are journaled in brackets 71 depending from the members of the main frame which rollers engage the inner surfaces of the elements of the lower stretch as the machine is operated.

In operation, rotation of the engine shaft is transmitted through the jack shaft 49 and the gear 54 mounted thereon to the gear 56 of the counter shaft 57, rotating the same so that a forward drive of the machine may be effected. If the gear 64 of the counter shaft is disposed in meshing engagement with its correlated gear 70 of the rear axle rotation of the counter shaft is transmitted to said rear axle and the endless tread element is actuated so as to move its lower stretch in a rearward direction thereby propelling the machine forward. The weight of the main frame is supported upon the elements of the tread through the medium of the rollers 70′, said elements presenting a smooth surface upon which the rollers may travel. To increase the speed of travel of the machine, the gear 64 is shifted so as to engage the clutch face with the clutch face of the gear 63, thereby disengaging said gear 64 from the gear 70. Owing to the relative ratios of the gears thus placed in mesh a different speed is imparted to the machine. The power is thus transmitted from the shaft 57 to the gear 64 through the clutch to the gear 63, and then to the gear 69. This shifting of the sleeve 61 is accomplished by the lever 65 the rear end of which is disposed within reach of the operator. A still higher speed is imparted to the vehicle by shifting the gear 64 in an opposite direction to engage the clutch face thereof with the clutch face of the gear 62.

To effect a travel of the machine in a reverse direction the gear 54 which is mounted on the jack shaft is shifted by means of its shifting lever 55 whereby to bring the gear into meshing engagement with the idler 58, the transversely extending counter shaft 57 then being rotated in a counter direction owing to the interposition of said idler.

The steering of the machine around a corner is facilitated by the provision of the ground engaging wheels 31 which are normally held out of engagement with the ground by means of a latch member 73, which is pivotally mounted upon the cross bar 28 of the trailer and engages the yoke 22, the latch member being moved to a disengaged position by means of a rearwardly extending handle 74 connected thereto. By releasing the yoke, the wheels fall by gravity to engagement with the ground, and owing to the forward travel of the machine the wheels are forced rearward so as to elevate the rear end of the machine out of engagement with the ground, thereby urging the upper end of the yoke forward until its movement is limited by engagement with the upper projecting end 75 of the arcuate guide members 29. In this position the axis of rotation of the ground engaging wheels 35 should be disposed rearward of a vertical line passing through the center of the rear axle thereby retaining the rear end of the tread in elevated position. The wheels may then be steered by rotating the steering wheel 43 so that its motion is transmitted through the rod 38 to the pinion 37 whereby the rack bar 35 is shifted in one direction or the other depending upon in which direction the machine is to be steered. The action of the steering mechanism is therefore similar to that of the conventional type of motor vehicles. To elevate the ground engaging wheels 31, or to return them to their normal position, it is but necessary to reverse the direction of travel of the machine as an entirety whereby the ground engaging wheels will obviously be shifted forward and raised, whereby the yoke may be reëngaged on its retaining member 73.

When the machine is driven over very soft earth it may be necessary to provide an additional bearing surface to prevent the machine from sinking into the soil. To this end, I provide a pair of wheels 76 having very broad treads which are provided with a removable axle 77 of a diameter sufficient to permit its insertion through the forward tubular axis 11 of the machine whereby the wheels may be mounted upon the ends of a shaft 77, which is inserted into the forward tubular axle 11 and which projects beyond the ends of the said axle as shown in Figs. 2 and 3 of the drawings.

Thus it will be seen that I have provided a tractor of the caterpillar type embodying many new and novel improvements which facilitate its operation, rendering the machine of greater value for the additional results that may be obtained by its use. It will be noted that the machine, vehicle, or whatever is to be transported or moved may be readily connected to the clevis provided on the rear end of the trailer.

Having thus described my invention what I claim as new and desire to secure by Letters Patent is:—

1. In a tractor, a frame, a pair of spaced sprockets mounted at each end of the frame, an endless tread element passing over said sprockets, means for rotating one pair of sprockets, a yoke pivotally mounted for rotation about the axis of one pair of sprockets, a pair of wheels carried by said yoke and mounted for steering, means releasably engaging said yoke to retain the steering wheel out of engagement with the ground, said retaining means when released permitting the wheels to engage the ground whereby one end of the tread may be elevated and means for steering the wheels.

2. In a tractor, a frame, a pair of spaced sprockets carried at each end of the frame, an endless tread element trained over the sprockets, means for rotating one pair of sprockets, a yoke pivoted for rotation about the axis of one pair of sprockets, a pair of steering knuckles carried by said yoke, steering wheels mounted on the knuckles, releasable means engaging the yoke to retain the steering wheels out of engagement with the ground, said means when released permitting the wheels to engage the ground whereby one end of the tread may be elevated, and means for steering the wheels.

3. In a tractor, a frame, a pair of spaced sprockets carried by each end of the frame, an endless tread element trained over the sprocket, means for rotating one pair of sprockets, a yoke pivotally mounted on the axle of one pair of sprockets, steering knuckles carried by said yoke, steering wheels mounted on the knuckles, rearwardly extending arms secured to the knuckles, a bar connecting the ends of said arms to rotate the steering wheels in unison, releasable means engaging the yoke to retain the steering wheels out of engagement with the ground, said means when released permitting the wheels to engage the ground whereby to elevate the tread, and means engaging the connecting bar whereby to steer the wheels.

4. In a tractor, a frame, a pair of sprocket wheels mounted at each end, an endless tread element trained over the sprockets, means for actuating one pair of sprockets, a yoke pivoted for rotation about the axis of one pair of sprockets, steering knuckles pivotally held in said yoke, steering wheels mounted on the knuckles, an arm carried by each steering knuckle extended rearwardly and provided at their rear terminals with a longitudinally extending slot, a transversely extending connecting bar having its terminals engaged in the slots of the arms, a series of rack teeth provided on said connecting rod, means engaging the rack teeth to shift the bar whereby the steering wheels may be oscillated, and releasable means engaging the yoke to retain the steering wheels out of engagement with the ground, said means when released permitting the wheels to engage the ground to elevate one end of the tread.

5. In a tractor, a frame, a pair of spaced sprockets carried at each end, an endless tread element trained over the sprockets, means for actuating one pair of sprockets, a yoke pivoted for rotation about the axis of one pair of sprockets, steering wheels mounted on the yoke, a pair of arcuate guides curved concentrically relatively to the axis of the pair of sprockets to which the yoke is connected, rollers mounted on the yoke to engage the guides, a stop on the guides to limit movement of the yoke whereby when the wheels are permitted to engage the ground, the rear end of the tread may be elevated, and means for steering the wheels.

6. In a tractor, a frame, an axle journaled at each end, one of said axles being of tubular construction, sprockets mounted on the axles, an endless tread element trained over the sprockets, means for actuating one set of sprockets, and a shaft extending through the tubular axle, and relatively broad ground engaging wheels mounted on the projecting ends of said axles.

In testimony whereof I affix my signature in presence of two witnesses.

LESTER B. DOMER.

Witnesses:
S. S. DOMER,
CHESTER DOMER.

Copies of this patent may be obtained for five cents each, by addressing the "Commissioner of Patents, Washington, D. C."